US011090762B2

(12) United States Patent
Hadano et al.

(10) Patent No.: US 11,090,762 B2
(45) Date of Patent: Aug. 17, 2021

(54) LASER PROCESSING APPARATUS

(71) Applicant: DISCO CORPORATION, Tokyo (JP)

(72) Inventors: Yuji Hadano, Tokyo (JP); Masatoshi Nayuki, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 174 days.

(21) Appl. No.: 16/157,283

(22) Filed: Oct. 11, 2018

(65) Prior Publication Data

US 2019/0105734 A1    Apr. 11, 2019

(30) Foreign Application Priority Data

Oct. 11, 2017  (JP) .............................. JP2017-197830

(51) Int. Cl.
| | | |
|---|---|---|
| *B23K 26/02* | (2014.01) | |
| *B23K 26/06* | (2014.01) | |
| *B23K 26/12* | (2014.01) | |
| *B23K 26/14* | (2014.01) | |
| *B23K 26/18* | (2006.01) | |

(52) U.S. Cl.
CPC ................................. *B23K 26/0665* (2013.01)

(58) Field of Classification Search
CPC ...................... B23K 26/02; B23K 26/06; B23K 26/062–0648; B23K 26/12–122; B23K 26/14–146; B23K 26/1462–1464; B23K 26/18

See application file for complete search history.

(56) References Cited

U.S. PATENT DOCUMENTS

| | | | | |
|---|---|---|---|---|
| 6,365,871 B1 * | 4/2002 | Knowles | ................ | B23K 26/18 219/121.67 |
| 2011/0192450 A1 * | 8/2011 | Liu | ....................... | B22F 1/0022 136/252 |
| 2011/0236569 A1 * | 9/2011 | Weiller | ................ | B23K 26/127 427/162 |
| 2013/0087948 A1 * | 4/2013 | Kitahara | ............. | H01L 21/3065 264/400 |
| 2014/0248757 A1 * | 9/2014 | Morikazu | ............... | H01L 21/78 438/463 |

(Continued)

FOREIGN PATENT DOCUMENTS

| | | |
|---|---|---|
| JP | 10305420 A | 11/1998 |
| JP | 2002192370 A | 7/2002 |

(Continued)

*Primary Examiner* — Michael A Laflame, Jr.
(74) *Attorney, Agent, or Firm* — Greer Burns & Crain Ltd.

(57) ABSTRACT

A laser processing apparatus includes a liquid supply mechanism at an upper portion of a holding unit. The liquid supply mechanism includes: a liquid chamber provided with a transparent plate located with a gap formed between the transparent plate and an upper surface of a workpiece held by the holding table; a liquid supply nozzle adapted to supply a liquid to the gap from one side of the liquid chamber; and a liquid discharge nozzle adapted to recover the liquid from the other side of the liquid chamber, to produce a flow of the liquid. A laser beam applying unit includes a condenser adapted to focus a laser beam emitted by a laser oscillator, to apply the laser beam to the workpiece held by the holding table through the transparent plate and the liquid supplied to the gap.

6 Claims, 6 Drawing Sheets

(56) References Cited

U.S. PATENT DOCUMENTS

| | | | | |
|---|---|---|---|---|
| 2017/0033007 A1* | 2/2017 | Ohura | .................... | H01L 21/268 |
| 2018/0161924 A1* | 6/2018 | Werner | ................ | B23K 26/146 |
| 2018/0161930 A1* | 6/2018 | Warashina | ........... | B23K 26/146 |
| 2019/0111518 A1* | 4/2019 | Hadano | .............. | B23K 26/0648 |
| 2019/0118304 A1* | 4/2019 | Sugiyama | .............. | B23K 26/38 |
| 2019/0232431 A1* | 8/2019 | Hadano | ................ | B23K 26/146 |
| 2019/0348325 A1* | 11/2019 | Obata | .................... | B23K 26/40 |
| 2020/0101564 A1* | 4/2020 | Shibazaki | ............... | B23K 26/08 |
| 2020/0139489 A1* | 5/2020 | Nakano | ................ | B23K 26/356 |

FOREIGN PATENT DOCUMENTS

| | | | |
|---|---|---|---|
| JP | 2004188475 A | 7/2004 | |
| JP | 2014221483 A | 11/2014 | |

\* cited by examiner

LASER PROCESSING APPARATUS

BACKGROUND OF THE INVENTION

Field of the Invention

The present invention relates to a laser processing apparatus for applying a laser beam to a plate-shaped workpiece to process the workpiece.

Description of the Related Art

A wafer in which a plurality of devices such as integrated circuits (ICs) and large-scale integrations (LSIs) are formed on a front surface thereof partitioned by a plurality of division lines (streets) is divided into individual device chips by a laser processing apparatus, and the divided device chips are used for electric apparatuses such as mobile phones, personal computers and illumination apparatuses.

As the laser processing apparatus, there are those of a type in which a laser beam of such a wavelength as to be absorbed in a workpiece is applied to the workpiece, with a focal point of the laser beam positioned on a surface of the workpiece, to perform ablation and to thereby form grooves as starting points of division (see, for example, Japanese Patent Laid-open No. Hei 10-305420), those of a type in which a laser beam of such a wavelength as to be transmitted through a workpiece is applied to the workpiece, with a focal point of the laser beam positioned inside the workpiece, to form modified layers as starting points of division in the inside of the workpiece (see, for example, Japanese Patent No. 3408805), and those of a type in which a laser beam of such a wavelength as to be transmitted through a workpiece is applied to the workpiece, with a focal point of the laser beam positioned inside the workpiece, to form a plurality of shield tunnels each of which includes a minute hole penetrating from a front surface to a back surface of the workpiece and serving as a starting point of division and an amorphous phase surrounding the minute hole (see, for example, Japanese Patent Laid-open No. 2014-221483). One of these types of laser processing apparatuses is appropriately selected according to the kind of the workpiece, processing accuracy, and the like.

In the type of applying ablation, of the above-mentioned types of laser processing apparatuses, debris (laser processing swarf) generated upon application of the laser beam to the surface of the wafer may be scattered and adhered to the surfaces of devices formed on the wafer, thereby lowering the quality of the devices. As a countermeasure against this problem, it has been proposed to coat the surface of the wafer with a liquid resin which transmits the laser beam to be used for processing, before the laser processing is performed, thereby preventing adhesion of the debris, and to remove the liquid resin after the laser processing is performed (see, for example, Japanese Patent Laid-open No. 2004-188475).

SUMMARY OF THE INVENTION

According to the technology described in Japanese Patent Laid-open No. 2004-188475, adhesion of debris to the surfaces of devices can be prevented, and processing quality is secured, owing to the coating with the liquid resin. This technology, however, has a drawback in that a step of coating with the liquid resin and a step of removing the liquid resin after the processing are needed, and productivity is therefore low. Further, since the liquid resin cannot be used repeatedly, this approach is uneconomical.

There has also been proposed a technology in which application of a laser beam is conducted while keeping the wafer immersed in water, to cause the debris float in water, thereby preventing adhesion of the debris to the surface of the wafer. However, in the case of applying a laser beam to the wafer while keeping the wafer immersed in water, minute bubbles are generated from the part of the wafer to which the laser beam is applied, so that the bubbles obstruct the propagation of the laser beam, making it impossible to achieve the desired processing.

It is therefore an object of the present invention to provide a laser processing apparatus such that a laser beam can be applied to a plate-shaped workpiece without being obstructed.

In accordance with an aspect of the present invention, there is provided a laser processing apparatus including: a holding unit provided with a holding table adapted to hold a plate-shaped workpiece; a laser beam applying unit adapted to apply a laser beam to the workpiece held by the holding table, to process the workpiece; and a liquid supply mechanism disposed at an upper portion of the holding unit, in which the liquid supply mechanism includes a liquid chamber provided with a transparent plate located with a gap formed between the transparent plate and an upper surface of the workpiece held by the holding table, a liquid supply nozzle adapted to supply a liquid to the gap from one side of the liquid chamber, and a liquid discharge nozzle adapted to recover the liquid from the other side of the liquid chamber, to produce a flow of the liquid, and the laser beam applying unit includes a laser oscillator adapted to emit the laser beam, and a condenser adapted to focus the laser beam emitted by the laser oscillator, to apply the laser beam to the workpiece held by the holding table through the transparent plate and the liquid supplied to the gap.

Preferably, the laser beam applying unit further includes dispersing means dispersing the laser beam emitted from the laser oscillator.

According to the present invention, the liquid supply mechanism including the liquid chamber provided with the transparent plate positioned with a gap formed between the transparent plate and the upper surface of the workpiece held by the holding table, the liquid supply nozzle adapted to supply a liquid to the gap from one side of the liquid chamber, and the liquid discharge nozzle adapted to recover the liquid from the other side of the liquid chamber to produce a flow of the liquid, is disposed at an upper portion of the holding unit. Therefore, a laser processing apparatus in which application of a laser beam to a workpiece is not obstructed is provided. In addition, in the case where the present invention is applied to a laser processing apparatus for performing ablation, it is possible, without coating the surface of the wafer with a liquid resin, to restrain adhesion of debris generated at the time of laser processing to devices, and thereby to prevent the device processing quality from being lowered.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
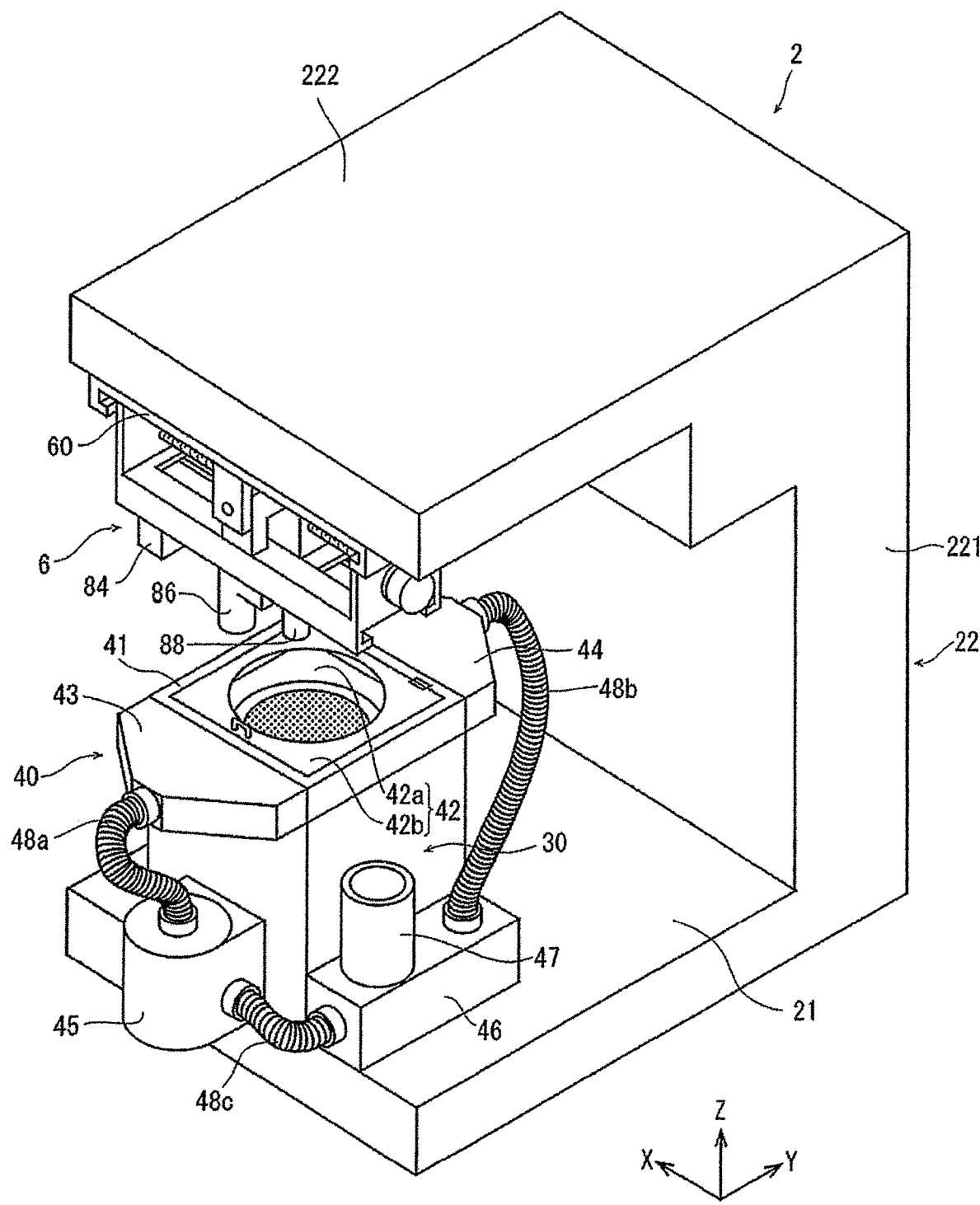
FIG. 1 is a perspective view of a laser processing apparatus according to an embodiment of the present invention.

A laser processing apparatus according to an embodiment of the present invention will be described more in detail below, referring to the attached drawings. FIG. 1 depicts a perspective view of a laser processing apparatus 2 of the present embodiment. The laser processing apparatus 2 includes: a base 21; a holding unit 30 disposed on the base 21 to hold a workpiece; a frame body 22 which includes a vertical wall section 221 erected in a Z-direction indicated by arrow Z on a lateral side of the holding unit 30 on the base 21, and a horizontal wall section 222 extending in a horizontal direction from an upper end portion of the vertical wall section 221; a liquid supply mechanism 40 disposed at an upper portion of the holding unit 30; and a laser beam applying unit 6 disposed on a lower surface of the horizontal wall section 222.

Figure 2:
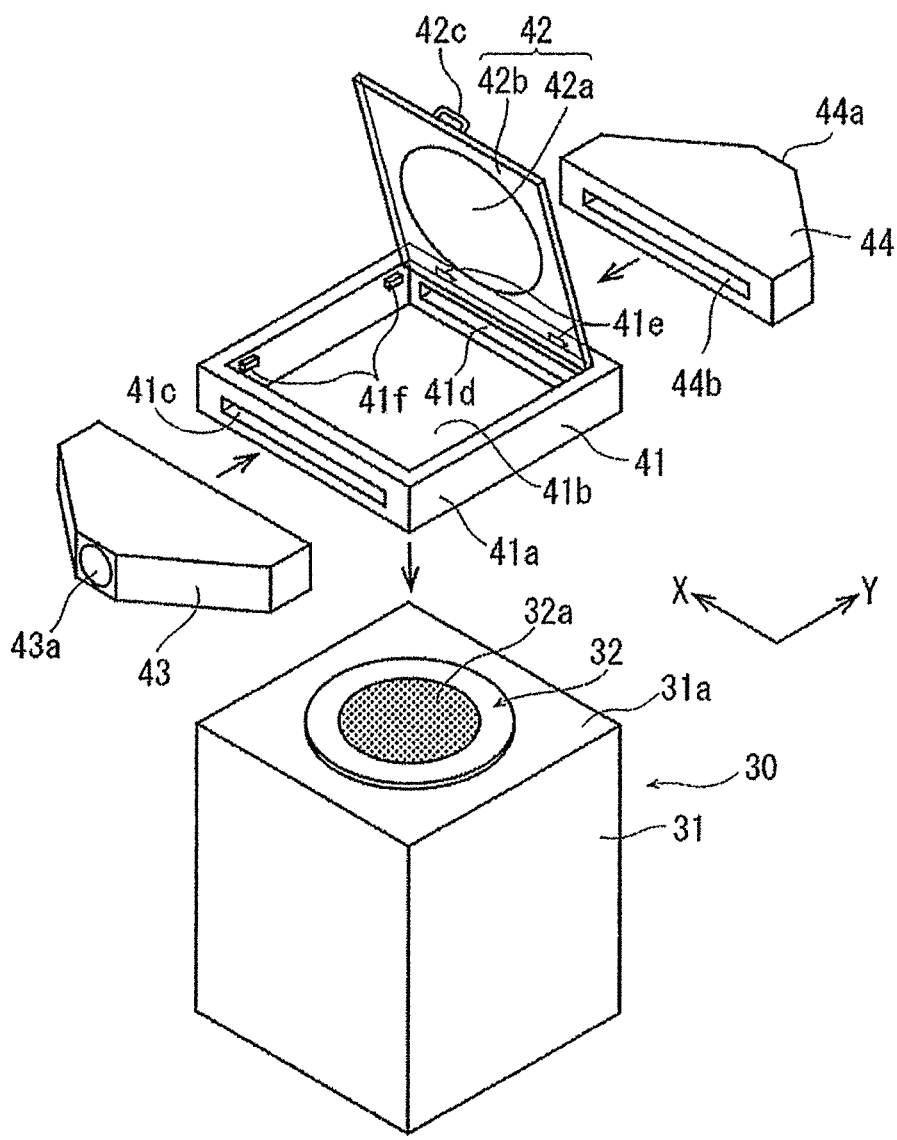
FIG. 2 is a partial exploded perspective view of a liquid chamber constituting a liquid supply mechanism, and a holding unit, of the laser processing apparatus depicted in FIG. 1.

FIG. 2 is a figure depicting, in an exploded state, each of configurations of the holding unit 30 as well as a liquid chamber 41, a liquid supply nozzle 43, and a liquid discharge nozzle 44 which constitute part of the liquid supply mechanism 40, and each of the configurations will be described below.

The holding unit 30 includes a rectangular parallelepiped holding base 31 fixed on the base 21, and a circular holding table 32 disposed at an upper surface section 31a of the holding base 31. The holding table 32 is configured to be rotatable by a rotating mechanism (not depicted). A central region of the holding table 32 is composed of a circular suction chuck 32a formed from an air-permeable material, for example, a porous ceramic. The suction chuck 32a is connected to a suction source (not depicted), and suction holds a plate-shaped workpiece placed on the suction chuck 32a.

As illustrated in FIG. 2, the liquid chamber 41 constituting part of the liquid supply mechanism 40 is placed on the upper surface section 31a of the holding base 31. The liquid chamber 41 includes a frame body 41a forming a rectangular space 41b penetrating in the vertical direction, and a cover plate 42 closing the upper side of the space 41b. A liquid supply port 41c providing communication between the space 41b in the frame body 41a and the exterior is disposed at one of two side surfaces opposed to each other in the direction indicated by arrow Y, of the four side surfaces constituting the frame body 41a, whereas a liquid discharge port 41d providing communication between the space 41b and the exterior is disposed at the other of the two side surfaces. Each of the liquid supply port 41c and the liquid discharge port 41d extends in a horizontal direction at the side surface where it is disposed, and is formed to be longer than the diameter of the suction chuck 32a.

The cover plate 42 includes a transparent plate 42a covering the upper side of the holding table 32, and a frame plate 42b supporting peripheral edges of the transparent plate 42a. The transparent plate 42a is composed of a glass plate, for example. The frame plate 42b is composed of a stainless steel plate, for example, and is formed to be substantially the same in shape as the space 41b in plan view, such as to close an upper portion of the space 41b in the frame body 41a together with the transparent plate 42a. The cover plate 42 is fixed to the frame body 41a by two hinges 41e, whereby it can be opened and closed at an upper portion of the space 41b in the frame body 41a. The transparent plate 42a is disposed in such a manner as to face the holding table 32 when the cover plate 42 is closed. Step portions 41f for supporting the cover plate 42 are disposed at a plurality of positions of each of inner walls of the four side surfaces constituting the frame body 41a. A knob portion 42c to be grasped at the time of opening or closing the cover plate 42 is formed at a tip upper portion of the cover plate 42.

As illustrated in FIG. 2, a liquid supply nozzle 43 is connected to that side surface of the frame body 41a at which the liquid supply port 41c is disposed. In addition, a liquid discharge nozzle 44 for discharging the liquid is connected to that side surface of the frame body 41a at which the liquid discharge port 41d is disposed. The liquid supply nozzle 43 and the liquid discharge nozzle 44 are so formed that they are each substantially triangular in plan view, and the thickness in the height direction thereof is substantially equal to that of the above-mentioned liquid chamber 41.

The liquid supply nozzle 43 is formed with a supply port 43a to be supplied with the liquid. The liquid supply nozzle 43 is formed therein with a passage (omitted in the illustration) through which the liquid supplied from the supply port 43a is guided to the liquid supply port 41c of the liquid chamber 41, and a discharge port (omitted in the illustration) in the same shape as the liquid supply port 41c is formed at a surface facing the liquid supply port 41c. The liquid supplied from the supply port 43a through the passage is guided to the liquid supply port 41c of the liquid chamber 41.

The liquid discharge nozzle 44 is formed in the same shape as the liquid supply nozzle 43. As depicted in FIG. 2, a supply port 44b in the same shape as the liquid discharge port 41d of the liquid chamber 41 is formed at a position facing the liquid discharge port 41d of the liquid chamber 41. The liquid supplied from the supply port 44b is discharged from the discharge port 44a by passing through the passage inside the liquid discharge nozzle 44. A packing (omitted in the illustration) is disposed along the whole perimeter of lower surface edge portions of the frame body 41. When the liquid chamber 41 is placed on the holding base 31 and the cover plate 42 is closed, a substantially hermetically closed gap inclusive of the upper surface section 31a of the holding base 31 is thereby formed.

Figure 3:
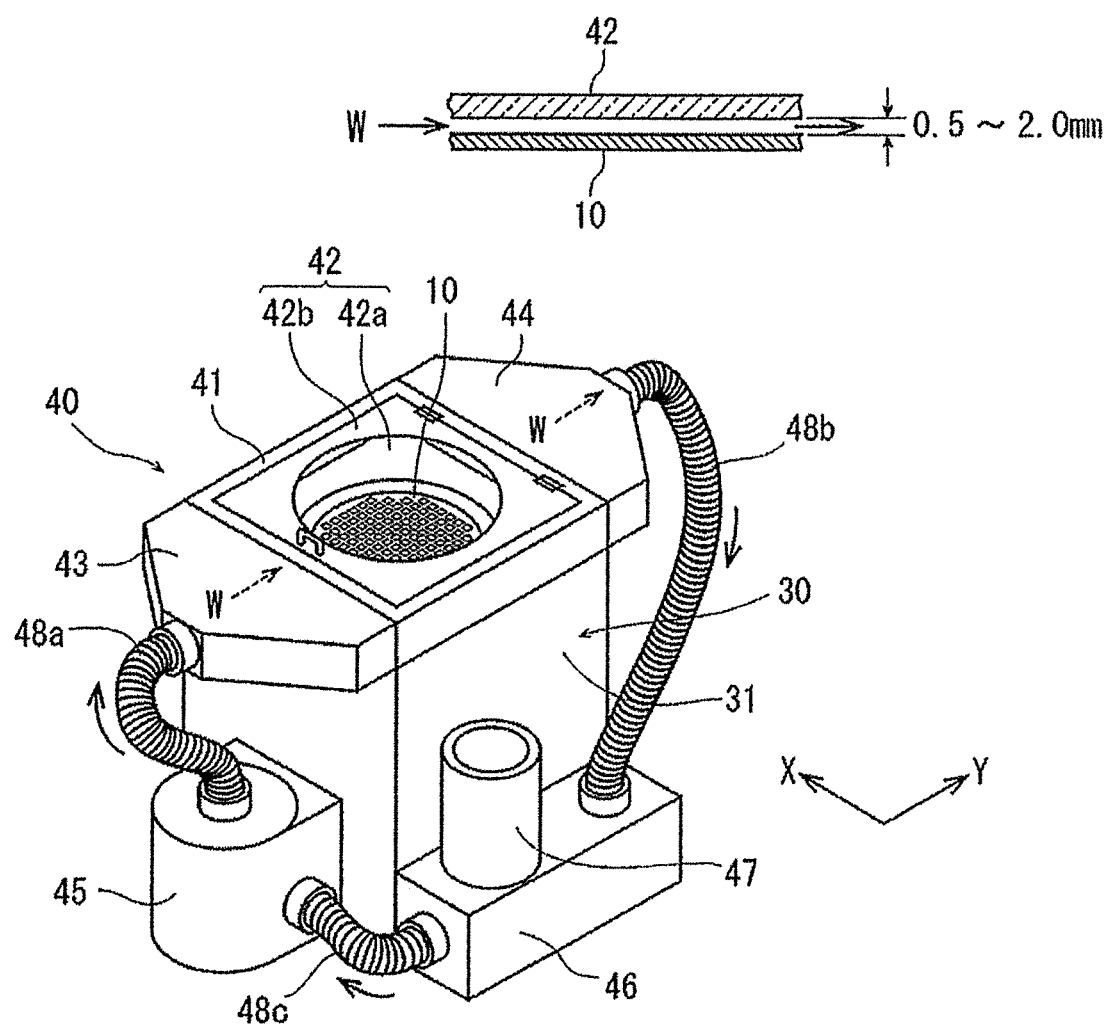
FIG. 3 is a perspective view of the liquid supply mechanism and the holding unit of the laser processing apparatus depicted in FIG. 1.

The liquid supply mechanism 40 will further be described referring to FIG. 3. FIG. 3 depicts a state in which a wafer 10 formed with devices on a front surface thereof is suction held, as a plate-shaped workpiece, by the holding table 32, and the cover plate 42 is closed. As depicted in a partially enlarged schematic sectional view at the upper side in FIG. 3, a gap of approximately 0.5 to 2.0 mm is formed between the wafer 10 held on the holding table 32 and the transparent plate 42a. As depicted in FIG. 3, the liquid supply mechanism 40 includes a liquid supply pump 45, a filter 46, and a liquid reserving tank 47 in addition to the above-mentioned liquid chamber 41, liquid supply nozzle 43, and liquid discharge nozzle 44. The liquid reserving tank 47 is disposed in the filter 46. The liquid supply pump 45 and the liquid supply nozzle 43 are interconnected by a first hose 48a, the liquid discharge nozzle 44 and the filter 46 are interconnected by a second hose 48b, and the filter 46 and the liquid supply pump 45 are interconnected by a third hose 48c. Each of the hoses 48a to 48c is composed of a resin-made flexible hose.

By the configuration as above, liquid W discharged from the liquid supply pump 45 is supplied into the liquid chamber 41 through the first hose 48a and the liquid supply nozzle 43, and the liquid W supplied into the liquid chamber 41 is discharged through the liquid discharge nozzle 44. Further, the liquid W discharge from the liquid discharge nozzle 44 is guided to the filter 46, to be filtrated thereby, and is returned to the liquid supply pump 45. In the liquid supply mechanism 40 in the present embodiment, the liquid W is permitted to gradually leak out through a gap between the liquid chamber 41 and a mating surface formed at an upper surface of the holding base 31, a gap between the cover plate 42 and the frame body 41, and the like; however, the amount of the liquid W reduced due to the leakage is appropriately compensated for from the liquid reserving tank 47. Note that the liquid reserving tank 47 also has a function of discharging air bubbles contained in the liquid W guided to the filter 46. By the configuration as above, the liquid W is circulated in the liquid supply mechanism 40. The flow speed of the liquid W flowing through the liquid chamber 41 can be controlled by controlling the feeding efficiency of the liquid supply pump 45, changing the internal volume of the liquid chamber 41, and/or controlling the opening areas of the liquid supply port 41c and the liquid discharge port 41d, and is controlled to a predetermined flow speed.

Figure 4:
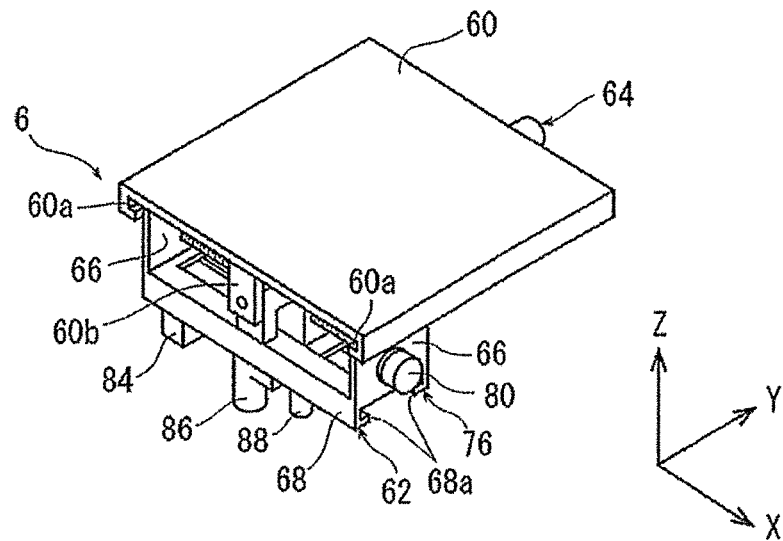
FIG. 4 is a perspective view of a laser beam applying unit of the laser processing apparatus depicted in FIG. 1.

The laser beam applying unit 6 will be described below, referring to FIGS. 1, 4 and 5. Note that FIG. 5 is an exploded perspective view of the laser beam applying unit 6 depicted in FIG. 4.

The laser beam applying unit 6 includes: a guide plate 60 fixed to a lower surface of the horizontal wall section 222 of the frame body 22 by fixing means (not depicted); a Y-axis direction movable member 62 supported by the guide plate 60 in such a manner as to be movable in a Y-axis direction; and a Y-axis direction moving mechanism 64 adapted to move the Y-axis direction movable member 62 in the Y-axis direction. The guide plate 60 is formed, at lower portions of both ends thereof in regard of an X-axis direction, with a pair of guide rails 60a extending in the Y-axis direction. As illustrated in FIGS. 4 and 5, the Y-axis direction movable member 62 includes a pair of guided sections 66 disposed at an interval in the X-axis direction, and a mounting section 68 arranged between lower ends of the guided sections 66 and extending in the X-axis direction. The guided sections 66 are formed at upper portions thereof with guided rails 66a extending in the Y-axis direction. The guided rails 66a of the guided sections 66 are engaged with the guide rails 60a of the guide plate 60, whereby the Y-axis direction movable member 62 is supported by the guide plate 60 such as to be movable in the Y-axis direction. In addition, the mounting section 68 is formed, at lower portions of both ends thereof in regard of the Y-axis direction, with a pair of guide rails 68a extending in the X-axis direction. The Y-axis direction moving mechanism 64 includes a ball screw 70 extending in the Y-axis direction under the guide plate 60, and a motor 72 connected to one end portion of the ball screw 70. A gate-shaped nut section 70a of the ball screw 70 is fixed to an upper surface of the mounting section 68. The other end portion, not connected with the motor 72, of the ball screw 70 is put in screw engagement with the nut section 70a, and is then rotatably supported by a support piece section 60b formed at a front edge portion of the guide plate 60. The Y-axis direction moving mechanism 64 converts a rotational motion of the motor 72 into a rectilinear motion and transmits the rectilinear motion to the Y-axis direction movable member 62, by the ball screw 70, whereby the Y-axis direction movable member 62 is moved in the Y-axis direction along the guide rails 60a of the guide plate 60.

Figure 5:
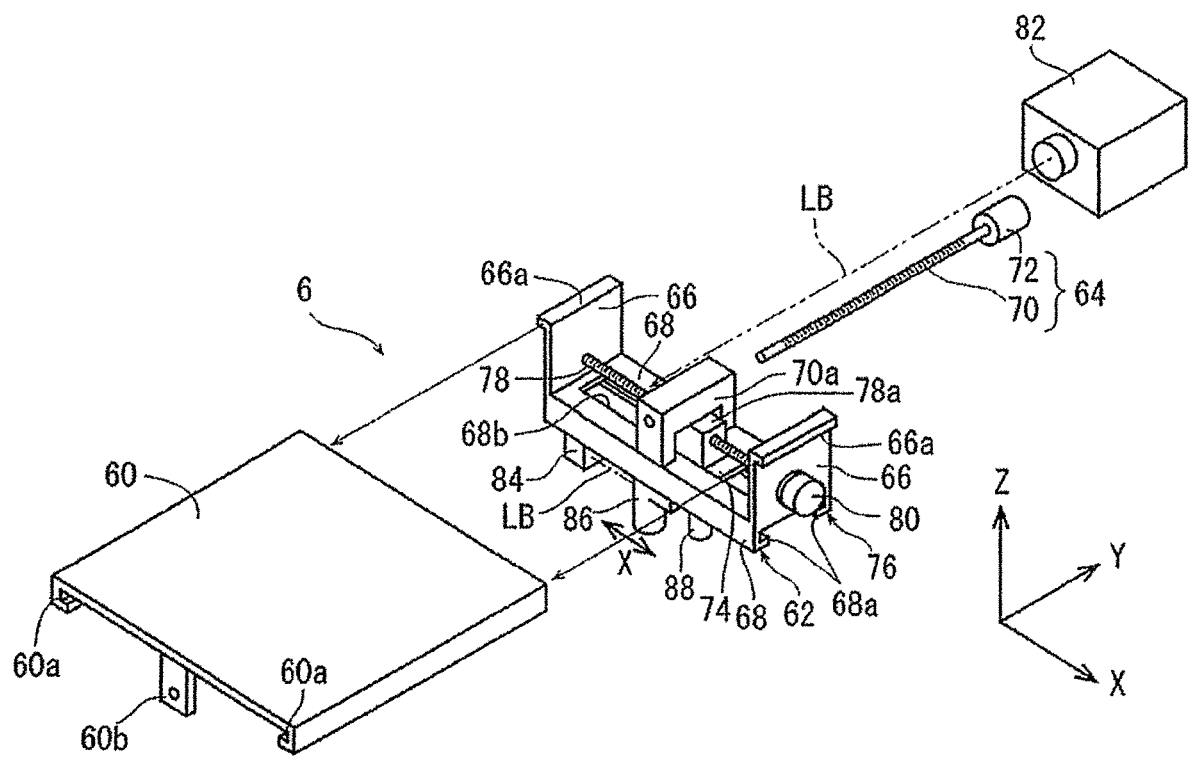
FIG. 5 is an exploded perspective view of the laser beam applying unit depicted in FIG. 4.

The description of the laser beam applying unit 6 will be continued while referring to FIG. 5. The laser beam applying unit 6 further includes: an X-axis direction movable plate 74 mounted to the mounting section 68 of the Y-axis direction movable member 62 in such a manner as to be movable in the X-axis direction; and an X-axis direction moving mechanism 76 adapted to move the X-axis direction movable plate 74 in the X-axis direction. Both end portions in regard of the Y-axis direction of the X-axis direction movable plate 74 are engaged with the guide rails 68a of the mounting section 68, whereby the X-axis direction movable plate 74 is mounted to the mounting section 68 such as to be movable in the X-axis direction. The X-axis direction moving mechanism 76 includes a ball screw 78 extending in the X-axis direction, and a motor 80 connected to one end portion of the ball screw 78 and supported by the guided section 66 on one side, on the upper side of the mounting section 68. A nut section 78a of the ball screw 78 is passed through an opening 68b of the mounting section 68 and is fixed to an upper surface of the X-axis direction movable plate 74. The other end portion, not connected with the motor 80, of the ball screw 78 is rotatably supported by the guided section 66 on the other side to which the motor 80 is not fixed. The X-axis direction moving mechanism 76 converts a rotational motion of the motor 80 into a rectilinear motion and transmits the rectilinear motion to the X-axis direction movable plate 74, by the ball screw 78, whereby the X-axis direction movable plate 74 is moved in the X-axis direction along the guide rails 68a of the mounting section 68.

Figure 6:
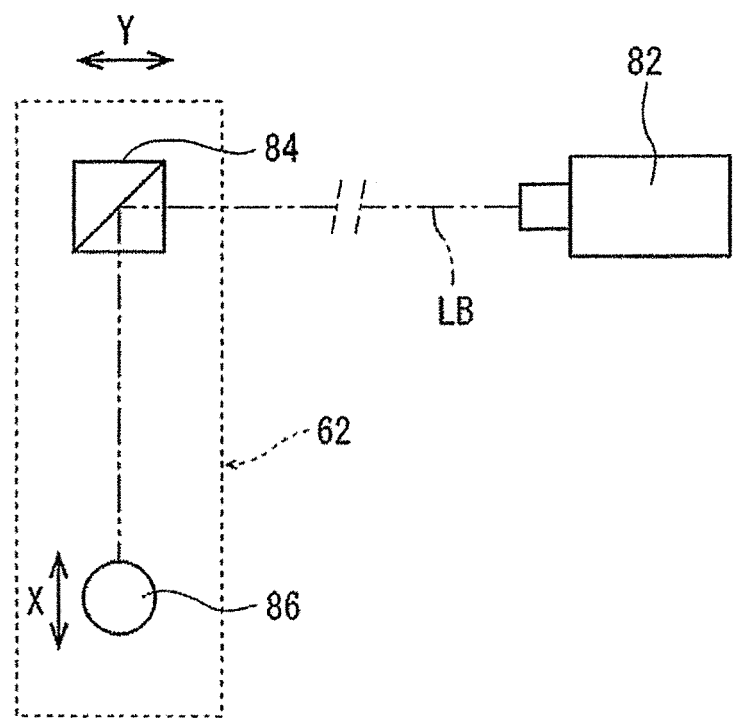
FIG. 6 is a block diagram depicting an optical system of the laser beam applying unit depicted in FIG. 4.

Further, the configuration of an optical system of the laser beam applying unit 6 will be described referring to FIGS. 5 to 8. As illustrated in FIGS. 1, 5 and 6, the laser beam applying unit 6 includes: a laser oscillator 82 incorporated in the horizontal wall section 222 of the frame body 22 and adapted to emit a pulsed laser beam LB; an attenuator (omitted in the illustration) adapted to control the output of the laser beam LB emitted from the laser oscillator 82; a rectangular prism mirror 84 mounted to a lower surface of the mounting section 68 of the Y-axis movable member 62 at an interval from the laser oscillator 82 in the Y-axis direction; a condenser 86 mounted to a lower surface of the X-axis direction movable plate 74 such as to be movable in the Z-axis direction; and focal point position control means (omitted in the illustration) for controlling the focal point of the condenser 86 in the Z-axis direction by moving the condenser 86 in the Z-axis direction. The laser oscillator 82 is configured to oscillate a laser beam of such a wavelength (for example, 355 nm) as to be absorbed in the workpiece. As depicted in FIG. 6, the laser beam LB applied from the laser oscillator 82 in the Y-axis direction has its propagation direction changed by 90 degrees by the rectangular prism mirror 84, to be guided to the condenser 86.

Figure 7:
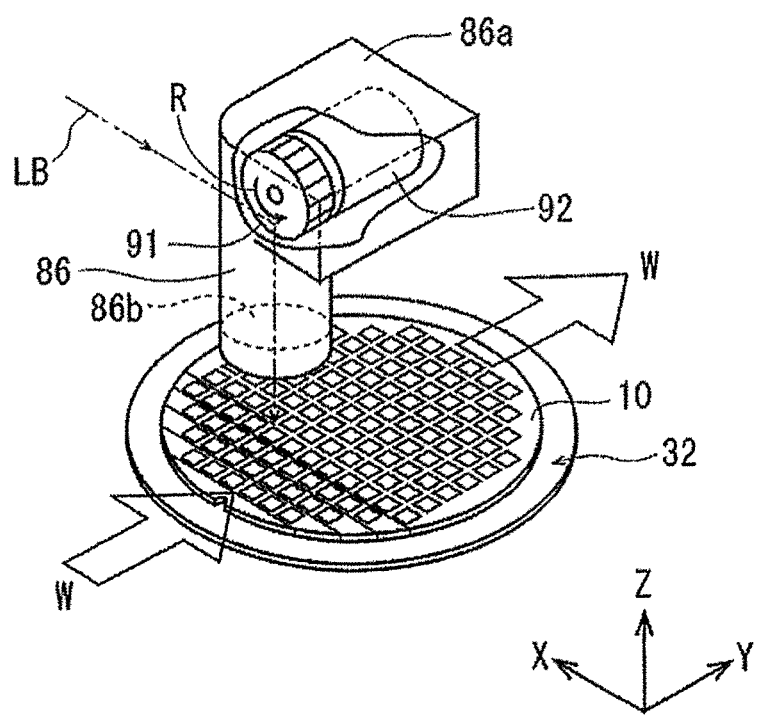
FIG. 7 is a perspective view depicting a state in which laser processing is conducted by the laser beam applying unit depicted in FIG. 5.
Figure 8:
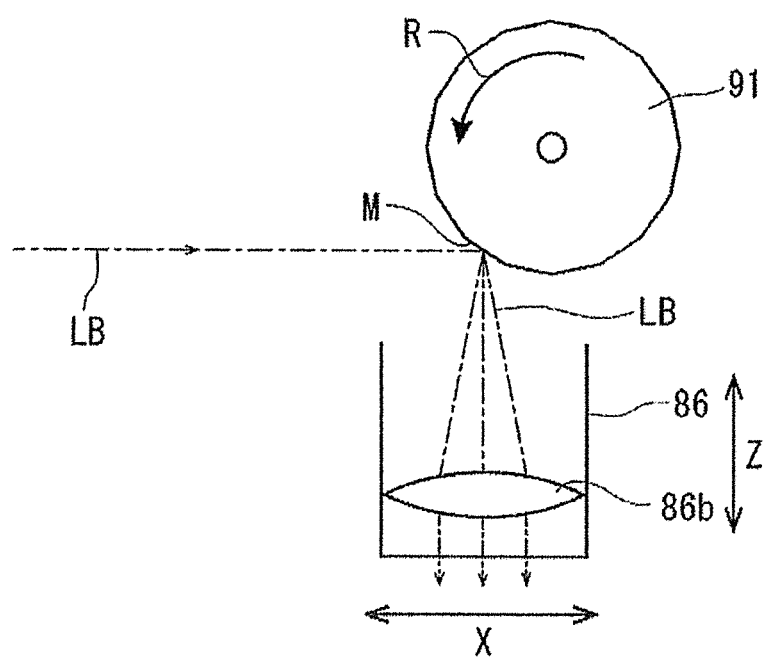
FIG. 8 is a side view of the laser beam applying unit for explaining the state in which the laser processing is performed as depicted in FIG. 7.

As illustrated in FIG. 7, a polygon mirror 91 as dispersing means for dispersing the laser beam LB emitted from the laser oscillator 82 and a motor 92 adapted to rotate the polygon mirror 91 at high speed in a direction indicated by arrow R are disposed inside an upper housing 86a of the condenser 86. Further, a focusing lens (fθ lens) 86b adapted to focus the laser beam LB to apply the laser beam LB to the workpiece is disposed at a lower portion of the condenser 86. As depicted in FIG. 8, the polygon mirror 91 has a plurality of mirrors M disposed concentrically with respect to a rotational axis of the polygon mirror 91. The fθ lens 86b is located under the polygon mirror 91, and is adapted to focus the laser beam LB to apply the laser beam LB to the workpiece on the holding table 32. The laser beam LB guided from the rectangular prism mirror 84 is guided to the fθ lens 86b in such a manner that the applying direction thereof is dispersed in the X-axis direction by the rotating mirrors M, and the laser beam LB is applied in the manner of being dispersed in a predetermined range in the X-axis direction on the workpiece.

Returning to FIG. 5 in continuing the description, an alignment unit 88 mounted at an interval from the condenser 86 in the X-axis direction is disposed, together with the condenser 86, at the lower surface of the X-axis direction movable plate 74. The alignment unit 88 is configured to image the workpiece held by the holding table 32, thereby detecting a region to be laser processed. Further, the laser beam applying unit 6 includes focal point position control means (not depicted). While a specific configuration of the focal point position control means is omitted in the illustration, the focal point position control means may include, for example, a ball screw which extends in the Z-axis direction and of which a nut section is fixed to the condenser 86, and a motor connected to one end portion of the ball screw. By such a configuration, a rotational motion of the motor is converted into a rectilinear motion, and the condenser 86 is moved along guide rails (omitted in the illustration) disposed in the Z-axis direction, whereby the position in the Z-axis direction of the focal point of the laser beam LB focused by the condenser 86 is controlled.

The laser processing apparatus 2 of the present invention is generally configured as above-described, and an operation thereof will be described below. First, a wafer 10 formed from silicon (Si) and formed with devices on a front surface thereof, which serves as a plate-shaped workpiece in the present embodiment, is prepared. After the wafer 10 is prepared, the cover plate 42 depicted in FIG. 1 is opened, and the wafer 10 formed with the devices is placed on the suction chuck 32a of the holding table 32, with the front surface oriented upward. After the wafer 10 is placed on the suction chuck 32a, the suction source (not depicted) is operated to generate a suction force on the suction chuck 32a, to hold the wafer 10 by suction. After the wafer 10 is held by the suction chuck 32a, the cover 42 is closed (see FIG. 3).

After the wafer 10 is held by the suction chuck 32a and the cover 42 is closed, the liquid reserving tank 47 of the liquid supply mechanism 40 is supplemented with a sufficient amount of the liquid W, and the liquid supply pump 45 is operated. As the liquid W to be circulated in the inside of the liquid supply mechanism 40, there may be used pure water, for example. With the operation of the liquid supply mechanism 40 started and with a predetermined time passed, the space 41b of the liquid chamber 41 is filled up with the liquid W, and the liquid W is stably circulated in the inside of the liquid supply mechanism 40.

In a state in which the liquid W is stably circulated by the liquid supply mechanism 40, the X-axis direction movable plate 74 is moved by the X-axis direction moving mechanism 76 of the laser beam applying unit 6, the Y-axis direction movable member 62 is moved in the Y-direction by the Y-axis direction moving mechanism 64 (see FIGS. 4 and 5), and the alignment unit 88 is positioned on the upper side of the transparent plate 42a of the cover plate 42. Since the transparent plate 42a is set in such a region as to front on the whole part of the holding table 32 from above, as aforementioned, the alignment unit 88 can get the picture of the whole region inclusive of the devices on the wafer 10. After the alignment unit 88 is positioned on the upper side of the wafer 10, a division line (street) as a processing position on the wafer 10 is imaged by the alignment unit 88. In this instance, the wafer 10 is imaged through the transparent plate 42a and the liquid W. Next, based on the image of the wafer 10 picked up by the alignment unit 88, the division line on the wafer 10 and the condenser 86 are aligned. After this alignment, the holding table 32 is rotated, the X-axis direction movable plate 74 is moved by the X-axis direction moving mechanism 76, and the Y-axis direction movable member 62 is moved by the Y-axis direction moving mechanism 64, whereby the division line extending in a first direction, of the division lines formed in a grid pattern on the wafer 10, is positioned along the X-axis direction, and the condenser 86 is positioned at one end portion of the division line, or a laser beam application starting position. Subsequently, the condenser 86 is moved in the Z-axis direction by the focal point position control means (not depicted), whereby the focal point is positioned at the height of the front surface of the one end of the division line on the wafer 10.

After the condenser 86 is moved in the Z-axis direction to position the focal point position at the height of the front surface of the wafer 10, the X-axis direction movable plate 74 is moved at a predetermined moving speed in the X-axis direction by the X-axis direction moving mechanism 76, while operating the laser beam applying unit 6. At the time of applying the laser beam LB to the wafer 10 to perform laser processing, the polygon mirror 91 is rotated at an appropriate rotating speed by the motor 92, as described above based on FIGS. 7 and 8. The positions of the mirrors M constituting the polygon mirror 91 vary attendant on the rotation of the polygon mirror 91, whereby the laser beam LB is applied to the wafer 10 in a dispersed manner. After the laser beam LB is applied to the predetermined mirror M, the laser beam LB is applied to the mirror M on the downstream side in regard of the rotational direction R of the polygon mirror 91, whereby the laser beam LB is applied to the wafer 10 in a dispersed manner. Such laser processing is repeated while the laser beam LB is emitted from the laser oscillator 82 and the polygon mirror 91 is rotated. Note that the number of sheets of the mirrors M constituting the polygon mirror 91, the rotating speed of the polygon mirror 91, and the like are appropriately determined according to the workpiece.

Note that the laser processing by the laser processing apparatus 2 as above-described may be carried out, for example, under the following processing conditions.

Wavelength of laser beam: 226 nm, 355 nm, 532 nm, 1,064 nm
Average output: 10 to 100 W
Repetition frequency: 0 to 300 MHz
Pulse width: 50 fs to 1 ns
Processing feed speed: 10 to 1,000 mm/second In the present embodiment, the liquid chamber 41 of the liquid supply mechanism 40 is placed on the holding table 32, and, as depicted in FIG. 7, the liquid W composed of pure water is constantly flowing at a predetermined flow speed in the Y-axis direction orthogonal to the X-axis direction which is the processing feed direction (note that the liquid chamber 41, the cover plate 42 and the like are omitted in FIG. 7, for convenience of explanation). In this state, the laser beam LB is applied to the division line on the wafer 10 through the liquid W, whereby ablation is performed. With the ablation applied to the front surface of the wafer 10, air bubbles are generated in the liquid W located at the position to which the laser beam LB is applied. In connection with this, in the present embodiment, the liquid W is constantly flowing at a predetermined flow speed through the gap formed on the wafer 10 (see FIG. 3), and, therefore, the air bubbles generated in the vicinity of the application position of the laser beam LB are swiftly flowed away to the downstream side of the liquid chamber 41. This ensures that in the case of applying the laser beam LB to the wafer 10 in a dispersing manner by use of the polygon mirror 91, the laser beam LB can be applied to the wafer 10 while avoiding the air bubbles generated attendant on the ablation, so that favorable ablation can be performed in a continued manner. Further, according to the present embodiment, even when debris is generated due to the ablation, the continued flow of the liquid W in the liquid chamber 41 ensures that the debris released into the liquid W is swiftly removed from the liquid chamber 41. Since the debris released into the liquid W is trapped by the filter 46 disposed in the liquid supply mechanism 40, the debris is prevented from being again circulated into the liquid chamber 41.

After the above-mentioned ablation is applied to the predetermined division line extending in the first direction, the Y-axis direction movable member 62 is moved in the Y-axis direction by the Y-axis direction moving mechanism 64, the condenser 86 is positioned at one end portion of the adjacent division line yet to be processed, and the same laser processing as the above-mentioned ablation is performed. After the ablation is applied to all the division lines extending in the first direction, the holding table 32 is rotated by 90 degrees, and the same ablation as above is applied also to the unprocessed division lines extending in the second direction orthogonal to the division lines extending in the first direction. In this way, ablation can be applied to all the division lines on the wafer 10.

As above-described, the hermetically sealed space 41b is formed by the liquid chamber 41 on the holding table 32, and at least the upper side of the holding table 32 is covered by the transparent plate 42a. The liquid W is made to flow at a predetermined flow speed within the space 41b, and the laser beam is applied through the transparent plate 42a and the liquid W, to perform laser processing. This ensures that the air bubbles generated from the surface of the wafer 10 and the debris generated due to the laser processing and the like are swiftly removed, and are prevented from obstructing the laser processing; in addition, adhesion of the debris to the devices after processing and the like trouble are prevented, and a lowering in quality is prevented.

Note that while the cover plate 42 has included the transparent plate 42a and the stainless steel-made rectangular frame plate 42b holding the peripheral edge of the transparent plate 42a in the above embodiment, this is not restrictive; the whole area of the cover plate 42 may be composed of a transparent plate. In addition, while the transparent plate 42a has been composed of a glass plate in the above embodiment, this is not limitative; the transparent plate 42a may be any transparent plate through which the laser beam LB is transmitted, and the transparent plate 42a may be a resin-made plate such as an acrylic resin plate, for example.

While an example in which the laser beam LB emitted from the laser oscillator 82 is guided to the focusing lens 86b in a dispersed manner by the polygon mirror 91 has been depicted in the above embodiment, this is not restrictive; a fixedly disposed reflection mirror may be used in place of the polygon mirror 91. Further, while an example in which the laser processing applied to the wafer 10 is ablation has been depicted in the above embodiment, the laser processing may be applied to a processing for forming modified layers in the inside of a workpiece (for example, the laser processing described in Japanese Patent No. 3408805) or a processing for forming so-called shield tunnels (for example, the laser processing described in Japanese Patent Laid-open No. 2014-221483).

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for applying laser beam to a wafer having a plurality of devices formed on a front surface of the wafer and partitioned by a plurality of division lines, said laser processing apparatus comprising:
   a holding unit provided with a holding table adapted to hold the wafer;
   a laser beam applying unit adapted to apply a laser beam to the wafer held by the holding table, to process the wafer; and
   a liquid supply mechanism disposed at an upper portion of the holding unit, wherein the liquid supply mechanism includes
   a frame body having a bottom opening configured to be placed on the holding table and a top opening;
   a cover plate for opening and closing the top opening of the frame body and having a transparent plate forming a gap between the transparent plate and an upper surface of the water held by the holding table;
   a liquid chamber for holding a liquid defined by the frame body, the cover plate and the holding table;
   a liquid supply nozzle adapted to supply the liquid to the gap from one side of the liquid chamber; and
   a liquid discharge nozzle adapted to recover the liquid from the other side of the liquid chamber, to produce a flow of the liquid, and
   wherein the laser beam applying unit includes an alignment unit configured to image the division lines partitioning the devices formed on the wafer, through the transparent plate and the flow of the liquid through the gap, a laser oscillator adapted to emit the laser beam, and a condenser adapted to focus the laser beam emitted by the laser oscillator, to apply the laser beam to the imaged division lines of the wafer held by the holding table through the transparent plate and the liquid supplied to the gap.

2. The laser processing apparatus according to claim 1, wherein the laser beam applying unit includes dispersing means dispersing the laser beam emitted from the laser oscillator.

3. The laser processing apparatus according to claim 1, wherein the gap formed between the transparent plate and an upper surface of the wafer is approximately 0.5 to 2.0 mm.

4. The laser processing apparatus according to claim 1, wherein the laser beam is applied to the front surface of the wafer.

5. The laser processing apparatus according to claim 1, further comprising a filter in fluid communication with the liquid supply nozzle and the liquid discharge nozzle, and configured to trap debris contained in the liquid discharged from the liquid chamber through the liquid discharge nozzle.

6. The laser processing apparatus according to claim 1, further comprising a liquid reserving tank in fluid communication with the liquid supply nozzle and the liquid discharge nozzle and configured to provide additional liquid in the liquid chamber to compensate for leakage of the liquid from the liquid chamber, and to discharge air bubbles contained in the liquid discharged from the liquid chamber through the liquid discharge nozzle.

* * * * *